UNITED STATES PATENT OFFICE.

FELIPPE SABOIA BANDEIRA de MELLO, OF RIO DE JANEIRO, BRAZIL.

ELECTRIC BATTERY.

1,148,152.　　　　　Specification of Letters Patent.　　Patented July 27, 1915.

No Drawing.　　Application filed October 23, 1913. Serial No. 796,949. REISSUED

*To all whom it may concern:*

Be it known that I, FELIPPE SABOIA BANDEIRA DE MELLO, of 76 Rua S. José, Rio de Janeiro, Brazil, have invented certain new and useful Improvements in or Relating to Electric Batteries, of which the following is a specification.

This invention relates to electric batteries and applies both to primary and to secondary batteries.

The leading feature of the invention consists in the employment, as a depolarizer, of a copper compound obtained by submitting protosulfid of copper (CuS) to the action of electric current in a solution of alkaline hydrate and exposing the resulting product to the air. As is known, protosulfid of copper can be obtained by the combustion of copper in sulfur vapor away from contact with the air.

In carrying out the invention in practice, I proceed as follows to form a depolarizing element:—The protosulfid of copper having been obtained in the manner above indicated, I break it into small pieces which I place in a cylinder of wire cloth (say copper) disposed around a metallic rod (say copper) which forms the axis of the depolarizer. The cylindrical element thus obtained will form a voltaic couple with zinc, having a concentrated solution of caustic soda as an electrolyte, and such a couple serves for converting the copper protosulfid to a porous mass containing subsulfid of copper ($Cu_2S$) according to the reaction $2CuS + electrolysis = Cu_2S + S$, which is the substance employed in the preparation of the depolarizer. The said couple has an E. M. F. of 0.7 volt, and I allow it to work for several days until complete reduction of the copper protosulfid to a porous mass formed of copper sulfid and caustic soda, and contained in the enveloping wire cloth cylinder. The cylindrical element is withdrawn from caustic soda and immersed or washed in ordinary water, which frees it from zincate of sodium. On then exposing the element to the air at ordinary temperature, the porous mass oxidizes, becoming an oxysulfid of copper, and the depolarizing element is then ready for use as an element in a primary or secondary battery with any suitable electrolyte, for example, caustic soda and any suitable element to form the other member of the couple, for example, zinc.

The new depolarizer has the property of reconstituting or regenerating itself easily so that it can work many times or almost indefinitely. For this reconstitution it suffices to immerse the exhausted depolarizer in plain water and to allow it to dry afterward in the air. It is thus reoxidized and can be used again in the same way.

What I claim as my invention and desire to secure by Letters Patent, is:—

1. The method of manufacturing a depolarizing substance for primary or secondary batteries which consists in converting by electrolysis sulfid of copper into a subsulfid of copper ($Cu_2S$), employing an electrolyte of an alkaline hydrate, and in oxidizing such subsulfid of copper by exposure to the air.

2. A depolarizing substance for electric batteries substantially consisting of oxysulfid of copper.

In witness whereof, I have hereunto signed my name in the presence of subscribing witnesses.

FELIPPE SABOIA BANDEIRA DE MELLO.

Witnesses:
　G. SEGOND,
　HANSON C. COXE,
　PHILIPPE D'MANTEVILL.